United States Patent [19]
Blanton

[11] 3,961,804
[45] June 8, 1976

[54] STEERING ARM ATTACHMENT ADAPTER FOR STEERING STABILIZER

[75] Inventor: Grover Blanton, Deming, N. Mex.

[73] Assignee: Steer Safe, Inc., Deming, N. Mex.

[22] Filed: Apr. 8, 1975

[21] Appl. No.: 566,116

[52] U.S. Cl. .................................................. 280/94
[51] Int. Cl.² ........................................... B62D 7/06
[58] Field of Search .................. 280/93, 94, 96.2 R, 280/124 R

[56] References Cited
UNITED STATES PATENTS

| | | | |
|---|---|---|---|
| 3,393,919 | 7/1968 | Ragsdale | 280/94 |
| 3,721,455 | 3/1973 | Blanton | 280/94 |
| 3,823,957 | 7/1974 | Bishop | 280/94 |
| 3,848,885 | 11/1974 | Hefren | 280/94 |

*Primary Examiner*—M. H. Wood, Jr.
*Assistant Examiner*—Terrance L. Siemens
*Attorney, Agent, or Firm*—Clarence A. O'Brien; Harvey B. Jacobson

[57] ABSTRACT

A generally planar plate body is provided for abutting against one side of the steering knuckle sleeve portion of a vehicle through which one end portion of a steering arm is secured. A pair of U-bolts are also provided and disposed in substantially parallel planes for snugly embracing the side of the end portion of the steering arm, at opposite ends of the steering knuckle sleeve portion, remote from the side of the sleeve portion against which the plate body is abutted. The free threaded ends of the parallel arms of the U-bolts are secured through the plate body and the side of the plate body toward which the closed ends of the U-bolts open includes a pair of abutment blocks provided with aligned outwardly opening notches formed in their outer extremities which embrace the adjacent portions of the steering arm and the plate body includes a pair of similarly angularly and outwardly directed anchor portions which project outwardly from the side of the plate body remote from the closed ends of the U-bolts with the outer extremities of the anchor portions provided with structure for removably anchoring corresponding ends of a pair of expansion springs thereto.

6 Claims, 2 Drawing Figures

STEERING ARM ATTACHMENT ADAPTER FOR STEERING STABILIZER

BACKGROUND OF THE INVENTION

Various types of steering stabilizers utilizing expansion and/or compression springs have heretofore been provided for stabilizing the front steering wheels of a vehicle and assisting the front steering wheels in movement toward neutral or straightforward positions. Various forms of structures have been provided for operatively connecting such steering stabilizers to steering knuckles, steering arms and hub assemblies.

Previously known structures of this type and including some of the basic structural features of the instant invention are disclosed in U.S. Pat. Nos. 1,064,111, 1,335,064, 1,367,584, 1,407,579 and 1,631,332.

BRIEF DESCRIPTION OF THE INVENTION

The adapter of the instant invention has been designed to provide a means whereby the wheel stabilizer disclosed in my prior U.S. Pat. No. 3,721,455 may be readily and effectively secured to a vehicle steering arm of the type having one end portion thereof secured through a steering knuckle sleeve portion. The adapter may be readily mounted on the corresponding steering arm through the utilization of only one simple hand tool and does not require any modifications to or disconnecting of the associated steering arm.

The adapter utilizes only a mounting plate and a pair of U-bolts secured through spaced portions of the mounting plate and yet the adapter provides a rigid anchoring structure for one pair of corresponding ends of the expansion springs of the wheel stabilizer disclosed in my above-noted prior patent.

The main object of this invention is to provide a rigid anchoring structure for attachment to the steering arm of a vehicle and which may be utilized to effectively anchor one pair of corresponding ends of a pair of expansion springs thereto.

A further object of this invention is to provide a bracket for attaching steering control springs to the steering arm of a vehicle, thereby eliminating the need for attaching spring anchor plates to the backing plate, brake drum housing, or other steerable component of the vehicle.

Another object of this invention is to provide an adapter in accordance with the immediately preceding objects and which may be attached to a corresponding steering arm with a minimum of effort and through the utilization of only one simple hand tool.

Another important object of this invention is to provide an adapter whose basic structural features may be readily slightly modified so as to adapt the invention for attachment to different steering arms.

A final object of this invention to be specifically enumerated herein is to provide an adapter in accordance with the preceding objects and which will conform to conventional forms of manufacture, be of simple construction and easy to install so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
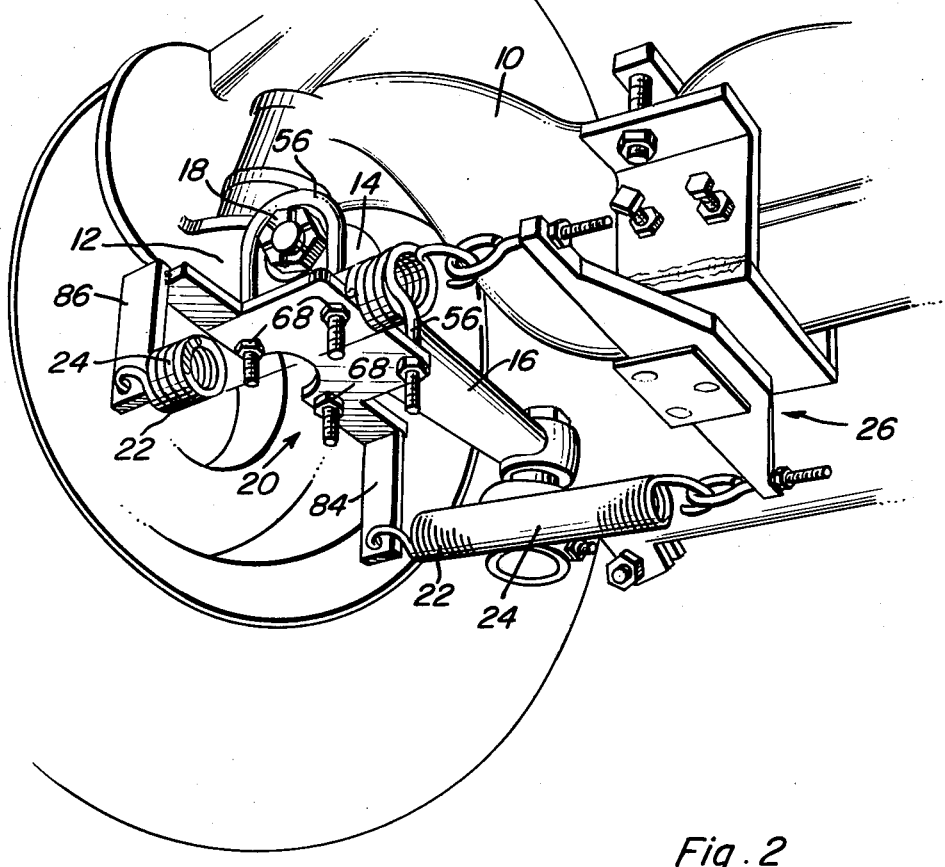
FIG. 1 is a fragmentary perspective view of one end portion of an I-beam axle of a heavy duty motor vehicle with the adapter of the instant invention operatively associated with the steering arm connected to the steering knuckle and wheel support oscillatable on the axle, the adapter being illustrated as an anchor assembly for one pair of corresponding end portions of the expansion springs of the wheel stabilizer disclosed in U.S. Pat. No. 3,721,455.
Figure 2:
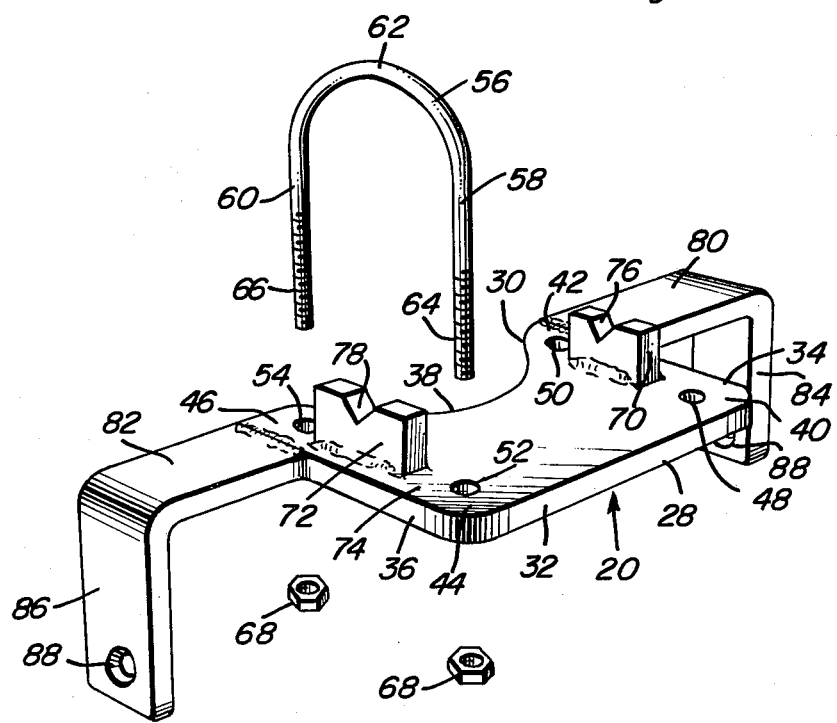
FIG. 2 is an exploded perspective view of the stabilizer adapter with one of the U-bolts thereof omitted.

Referring now more specifically to the drawings, the numeral 10 generally designates an I-beam axle from one end of which a steering knuckle 12 is oscillatably supported. The steering knuckle 12 includes an outstanding sleeve portion 14 open at its opposite ends and through which one end of a steering arm 16 is secured by means of a castellated nut 18.

The adapter of the instant invention is referred to in general by the reference numeral 20 and is utilized as an anchor assembly for one pair of corresponding ends 22 of the expansion springs 24 of the wheel stabilizer assembly referred to in general by the referance numeral 26 and disclosed in my prior U.S. Pat. No. 3,721,455. The adapter 20 includes a generally planar plate body 28 which is essentially rectangular in plane shape and includes opposite side marginal edges 30 and 32 and opposite end marginal edges 34 and 36. The side marginal edge 30 includes an inwardly recessed portion 38 defining an outwardly opening substantially full length radiused recess.

The four corner portions 40, 42, 44 and 46 of the plate body 28 include through bores 48, 50, 52 and 54, respectively.

A pair of U-bolts 56 are provided and each U-bolt 56 includes a pair of generally parallel arms 58 and 60 interconnected at one pair of corresponding ends by means of an integral curved bight portion 62. The free ends of the arms 58 and 60 are externally threaded as at 64 and 66. Of course, threaded nuts 68 are provided for the threaded ends 64 and 66 of the arms 58 and 60.

The opposite end marginal portions of the plate body 28 include abutment blocks 70 and 72 which project outwardly from one side 74 of the plate body 28. The abutment blocks 70 and 72 are secured to the plate body 28 in any convenient manner such as by welding and the outer end edges of the abutment blocks 70 and 72 include aligned outwardly opening notches 76 and 78.

The end marginal edges 34 and 36 of the plate body 28 further include endwise outwardly projecting extension arms 80 and 82 secured to the plate body 28 at their inner ends in any convenient manner such as by welding. The outer ends of the extension arms 80 and 82 include right angularly directed anchor portions 84 and 86 which project outwardly of the side of the plate body 28 remote from the side 74. The outer ends of the anchor portions 84 and 86 include through bores 88.

In mounting the adapter 20 on the steering arm 16, the plate body 28 is disposed below the sleeve portion 14 of the steering knuckle 12 in the manner illustrated in FIG. 1 of the drawings and the U-bolts 56 are positioned over the end portion of the steering arm 16 secured through the sleeve portion 14 closely adjacent the opposite ends of the sleeve portion 14. Actually, one of the U-bolts 56 may be engaged about the upper side of the castellated nut 18. The free ends of the arms 58 and 60 of the U-bolts 56 are passed downwardly through the corresponding corner bores 48, 50 and 52, 54 formed in the plate body 28 and are secured therethrough by means of the nuts 68. In this manner, the plate body 28 may be tightly clamped not only to the sleeve portion 14 of the steering knuckle 12 but also to the end portion of the steering arm 16 secured through the sleeve portion 14.

It is to be understood, however, that the abutment blocks 70 and 72 cradle the adjacent portions of the support arm 16 and the castellated nut 18. In any event, after the plate body 28 has been secured to the support arm 16 and the sleeve portion 14, the adjacent ends 22 of the expansion springs 24 may have their terminal ends hooked through the bores 88.

In some instances, the extent that the abutment blocks 70 and 72 project away from the sides 74 of the plate body 28 may be varied in order to tailor the adapter for a particular installation. In addition, the notched outer end of the abutment block 72 is flat on either side of the notch 78 and the width of the notch 78 is only so wide as to cradle one corner portion of the associated castellated nut 18. However, if the castellated nut 18 happens to be rotated to a position with one of the flats thereof disposed lowermost, that lowermost flat of the castellated nut 18 is of sufficient extent to bridge the notch 78. Still further, the notch 76 may be replaced by a curved notch as opposed to an angulated notch and in some instances the outer end faces of both of the abutment blocks 70 and 72 may be merely flat and free of notches.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A steering stabilizer mount for the steering arm of a vehicle equipped with a hub mounted steering arm having one end portion secured through a steering knuckle, said mount including a generally planar plate body including means on one side thereof for abutting against one side of the steering knuckle sleeve portion through which said one end portion of said arm is secured, a pair of U-bolts each including a pair of generally parallel arms interconnected at one pair of corresponding ends by means of an integral curved bight portion and threaded at the other pair of ends thereof, said pair of U-bolts being disposed in substantially parallel planes for snugly embracing the side of said one end portion of said steering arm, at the opposite ends of said sleeve portion, remote from said one side of said sleeve portion, and the threaded ends of said parallel arms being secured through said plate body.

2. The combination of claim 1 wherein said plate body includes a pair of similarly angularly and outwardly directed anchor portions spaced outwardly of the remote sides of said U-bolts and extending outwardly of the side of said plate body remote from said curved bight portions of said U-bolts, the outer free end portions of said outwardly directed portions including means adapted to have corresponding ends of a pair of expansion springs anchored thereto.

3. The combination of claim 1 wherein said means on said one side of said plate body for abutting against said steering knuckle includes a pair of outstanding abutment block portions spaced along a path extending centrally between the arms of both of said U-bolts.

4. The combination of claim 3 wherein the outer extremities of said abutment blocks include aligned outwardly opening notches.

5. The combination of claim 4 wherein said abutment blocks are each centrally spaced between the arms of a corresponding U-bolt.

6. The combination of claim 5 wherein said plate body includes a pair of similarly angularly and outwardly directed anchor portions spaced outwardly of the remote sides of said U-bolts and extending outwardly of the side of said plate body remote from said curved bight portions of said U-bolts, the outer free end portions of said outwardly directed portions including means adapted to have corresponding ends of a pair of expansion springs anchored thereto.

* * * * *